United States Patent [19]

Endo

[11] 4,015,179
[45] Mar. 29, 1977

[54] DC MOTOR CONTROL CIRCUIT
[75] Inventor: Takeshi Endo, Matsumoto, Japan
[73] Assignee: Kabushiki Kaisha Suwa Seikosha, Tokyo, Japan
[22] Filed: Dec. 23, 1974
[21] Appl. No.: 535,916
[30] Foreign Application Priority Data
　　Dec. 21, 1973　Japan .................... 48-146827[U]
[52] U.S. Cl. ............................... 318/275; 318/383
[51] Int. Cl.² ....................................... H02P 1/18
[58] Field of Search ......... 318/139, 269, 273, 275, 318/379, 383, 385, 400, 447

[56] References Cited
UNITED STATES PATENTS
| 3,582,747 | 6/1971 | Kearns | 318/379 |
| 3,732,475 | 5/1973 | Geerling | 318/275 |

Primary Examiner—James R. Scott
Assistant Examiner—W. E. Duncanson, Jr.
Attorney, Agent, or Firm—Blum, Moscovitz, Friedman & Kaplan

[57] ABSTRACT

A DC motor control circuit for providing improved starting and stopping control is provided. The control circuit includes a DC constant voltage source, a control transistor, a DC motor and a switching transistor having a first switching control electrode and two further electrodes defining a current path connected in parallel with the DC motor. The parallel connection of the DC motor and switching transistor electrodes is further connected in series with the DC constant voltage source and control transistor. A drive circuit is coupled to the switching transistor control electrode and is adapted to produce a starting signal for opening said switching transistor current path, and a stopping signal for closing said switching transistor current path in response to the respective application of either a stop signal or a start signal to the driving circuit.

10 Claims, 2 Drawing Figures

DC MOTOR CONTROL CIRCUIT

BACKGROUND OF THE INVENTION

This invention is directed to a DC motor control circuit, and in particular, to a control circuit for effecting improved starting and stopping of the DC motor.

Heretofore, the use of DC motors for rotation at constant speeds has presented no problem. However, the starting and stopping of such constant rotation DC motors has been less than completely satisfactory when same are to be started in response to a low-magnitude voltage, wherein constant rotational speed is required immediately after starting. Such uses are voiceactuated instruments wherein a faint voice signal is required to effect a driving of a DC motor at a constant rotational speed immediately upon starting is one such type of use. Additionally, scenery cameras, printer instruments, automatic control instruments and the like, all require a high-performance, stable-operating constant rotational speed DC motor. Accordingly, a DC motor control circuit wherein improved starting and stopping is provided, and wherein the rotational speed of the rotor can be maintained constant regardless of changes in load, ambient temperature and the DC supply voltage is desired.

SUMMARY OF THE INVENTION

Generally speaking, in accordance with the invention, a DC control circuit for providing improved starting and stopping control is provided. A DC constant voltage source, a control transistor and a switching transistor having a first switching control electrode and two further electrodes defining a current path connected in parallel with a DC motor are provided. The parallel connection of the switching transistor current path electrodes and the DC motor are series connected to the DC voltage source and the control transistor. A drive circuit is coupled to the first switching control electrode and is adapted to produce a starting signal for opening the switching transistor current path, and a stopping signal for closing the switching transistor current path in response to the respective application of either a start signal or stop signal to the driving circuit.

Accordingly, it is an object of this invention to provide a DC motor control circuit wherein improved starting and stopping is provided.

Another object of this invention is to provide a simplified, inexpensive, highly reliable, and stable-operating DC control circuit wherein improved starting and stopping is effected.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DETAILED DESCRIPTION OF THE PREFERRED EMBODIMENTS

Figure 1:
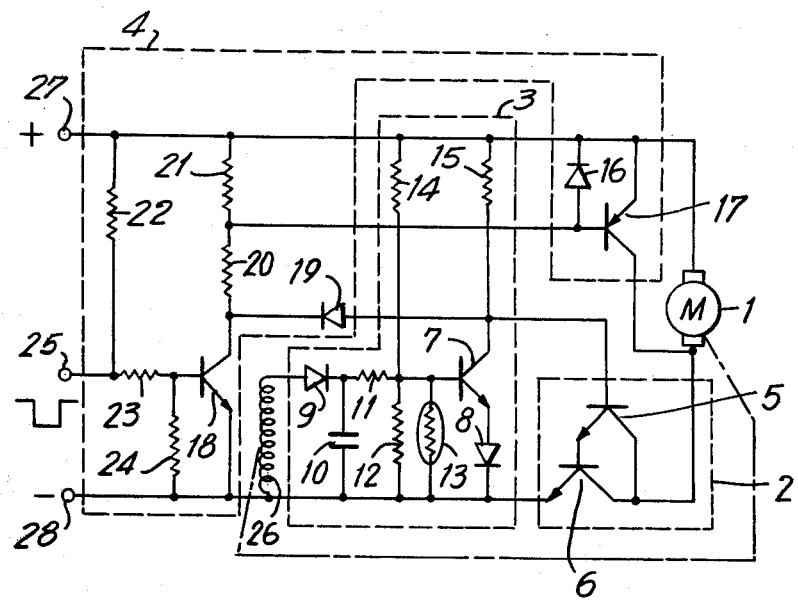
FIG. 1 is a circuit diagram of a DC motor control circuit constructed in accordance with a preferred embodiment of the instant invention.

Reference is now made to FIG. 1, wherein a DC motor control circuit adapted to provide improved starting and stopping to DC motor 1 is depicted. The DC motor control circuit, generally indicated as 2, includes a speed detection circuit, generally indicated as 3, and a start-stop drive control circuit, generally indicated as 4.

The control circuit 2 includes a first control transistor 5 and a power-stage transistor 6, coupled in a well-known manner to define a Darlington connection. The collector and emitter electrodes of power transistor 6 define a current path in series connection with the terminals of the DC voltage source and DC motor 1. As will be discussed in greater detail below, the base electrode of first control transistor 5 is utilized as an ON-OFF control electrode.

DC motor 1 also includes a coil 26 for sensing an alternating-current dynamo electric signal proportional to the rotational speed of the rotor. Accordingly, coil 26 applies a speed electric signal proportional to the rotational speed of the rotor to a half-wave rectifier circuit in speed-detecting circuit 3 formed by diode 9 and capacitor 10. A voltage divider circuit including resistors 11 and 12 and temperature-compensating thermistor 13 are coupled to the base electrode of speed-detecting transistor 7 in order to divide the speed-detecting signal and apply same to the speed-detecting transistor base electrode. Accordingly, the rotational speed of the DC motor may be varied by varying either resistor 11 or resistor 12. The collector electrode of speed-detecting transistor 7 is coupled to the base electrode of control transistor 5. The emitter electrode of speed-detecting transistor 7 is coupled through a diode 8 to the negative terminal 28 of the DC voltage source. A resistor 15 is coupled to the collector electrode of speed-detecting transistor 7 and the base electrode of control transistor 5 to provide a load for the speed-detecting transistor 7 and effect a supply of current to the base electrode of control transistor 5. A resistor 14 is coupled to the voltage divider circuit formed by resistors 11 and 12, and thermistor 13 to prevent a change in the rotational speed of the motor in response to changes in the supply voltage.

START-STOP circuit 4 includes a stopping transistor 17 having its emitter to collector path coupled in parallel with DC motor 1. A diode is coupled between the emitter electrode and base electrode to absorb any reverse-induced EMF voltages. START-STOP drive circuit 4 also includes a drive transistor 18. The collector electrode of drive transistor 18 is coupled through resistor 20 to the base electrode of stopping transistor 17. Resistors 22, 23 and 24 define a divider circuit for coupling input control terminal 25 to the base electrode of drive transistor 18 to enable an externally applied START-STOP signal to be applied thereto. Also, a resistor 21 is coupled to terminal 27 of the voltage source and to the base electrode of stopping transistor 17 for maintaining the potential fixed at the base electrode of transistor 17 when the DC motor is rotating in a manner to be more fully discussed below.

In order to understand the operation of the instant invention, the following relationship between the baseto-emitter voltage, constant voltage source, and control signal voltage is best understood. When the base electrode of drive transistor 18 does not have a potential applied thereto, the following formulas apply:

$$\frac{e\beta}{E} = \frac{R_{24}}{R_{22} + R_{23} + R_{24}} \quad (1)$$

$$\frac{e\beta}{e_{in}} = \frac{R_{24}}{R_{23} + R_{24}} \quad (2)$$

where $R_{22}$, $R_{23}$ and $R_{24}$ are the resistors 22, 23 and 24 depicted in FIG. 1; $e_{in}$ is the START-STOP voltage to be applied to terminal 25; E is the DC voltage applied across terminals 27 and 28; and $e\beta$ is the base to emitter voltage of driving transistor 18. In accordance with state of the art circuit principles, a base-to-emitter voltage for effecting a conducting of the collector-emitter current path in an NPN transistor is on the order of 0.6 to 0.7 volts at 25° C. Accordingly, when the base-to-emitter voltage $e\beta$ determined by multiplying the supply voltage times the division ratio determined by resistors 22, 23 and 24 in Equation 1 is greater than 0.6 to 0.7 volts at 25° C, the collector-emitter path of driving transistor 18 defines a low or negligibly resistant current path and hence renders the transistor fully conductive. However, when the base-to-emitter voltage is of a range wherein the drive transistor 18 is not placed in an isolated or open condition wherein an infinite impedance path is provided, a DC motor will continue to rotate. Thus, even in the event that the DC power source is turned off, a large capacitor disposed in the DC power source will result in a gradual lowering of the applied voltage and hence cause rotation of the DC motor to be diminished but not terminated. Accordingly, the division ratio of resistors 22 through 24 is selected to render a base-to-emitter voltage less than the starting voltage of the DC motor 1, so that the DC motor is not rotated in response to the static load applied thereto. Accordingly, when the START-STOP control signal $e_{in}$ is at a high potential, the driving transistor is rendered conductive, and when the START-STOP signal is at a low potential, the current path of the drive transistor is substantially open or at an infinite impedance.

With respect to the emitter-to-base voltage, $e\beta$, in Equation (2) above, if the product of the division ratio of resistors $R_{23}$ and $R_{24}$ and START-STOP control signal $e_{in}$ is 0.6 to 0.7 volts or more, the driving transistor is rendered conductive. When the product is less than such a value, the driving transistor is nonconductive and defines an infinite impedance current path. The START-STOP voltage can, therefore, be brought from a low potential to a high potential. Accordingly, no inconvenience occurs even if the saturated voltage of the transistor connected to produce the low voltage level is higher than the base emitter voltage of the driving transistor 18. In view thereof, it is therefore unnecessary to select a drive transistor having a low saturated voltage in order to utilize the START-STOP control arrangement in accordance with the invention. Instead, any transistor can be used.

In operation, the control circuit depicted in FIG. 1 includes a DC voltage applied to the power source terminals 27 and 28. In response to the START-STOP control signal being maintained at a low potential, driving transistor 18 is rendered nonconductive, hence maintaining the collector electrode at a high potential. In view thereof, current is applied through resistor 15 to the base electrode of control transistor 5, thereby causing current to be applied to DC motor 1 to effect a starting of same. Because the potential of the collector electrode of drive transistor 18 is at a high potential, the base electrode of stopping transistor 17 is biased at a high potential to open the stopping transistor collector-emitter current path across the DC motor. When the rotational speed of the DC motor is slowed, the base electrode of control transistor 5 effects an increase in the current applied to the motor and hence an increase in the rotational speed thereof. The speed-detecting signal produced by coil 26 is increased in proportion to the rotational speed of the motor. Accordingly, if the rotational speed exceeds a predetermined level, the speed-detecting transistor 7 is rendered conductive, thereby lowering the potential on the base electrode of control transistor 5 and causing a cutting off of the current applied to the DC motor to thereby reduce the rotational speed of the motor. Thus, control circuit 2 is rendered conductive in response to a slowing of the DC motor and is rendered nonconductive in response to a speeding up of the DC motor to thereby effect a constant-speed DC motor. Diode 8 is further utilized when speed-detecting transistor 7 is conductive as a reference voltage level for comparison with the voltage produced in coil 26 in order to effect a comparison of the speed-detecting signal against a predetermined level reference voltage.

When it is desired to stop the rotation of the rotor, the higher potential START-STOP control signal is applied to terminal 25, thereby rendering drive transistor 18 conductive. When drive transistor 18 becomes conductive, the collector electrode is then referenced to a negative potential 28 of the power source. Thus, the base electrode of control transistor 5 is also referenced through diode 19 to the negative reference potential at terminal 28, causing the control circuit 2 to become nonconductive. Additionally, referencing of the collector electrode to the negative reference potential causes application of current to the base electrode of stopping transistor 17 to render same conductive. Although the rotor in a DC motor can idle or run slowly in response to the holding energy when the current applied to the Dc motor is abruptly cut off, because the motor is in parallel with a negligible impedance current path defined by stopping transistor 17, the rotor is quickly stopped by the lack of current applied thereto.

It is noted that when the STOP-START control signal applied to terminal 25 is at a low potential, diode 19 renders nonconductive transistor 17 by maintaining the collector electrode voltage of driving transistor 18 at a high potential if the speed-detecting transistor 7 is rendered conductive to thereby prevent inadvertent stopping of the motor in response to speed-detection control of the DC motor.

Figure 2:
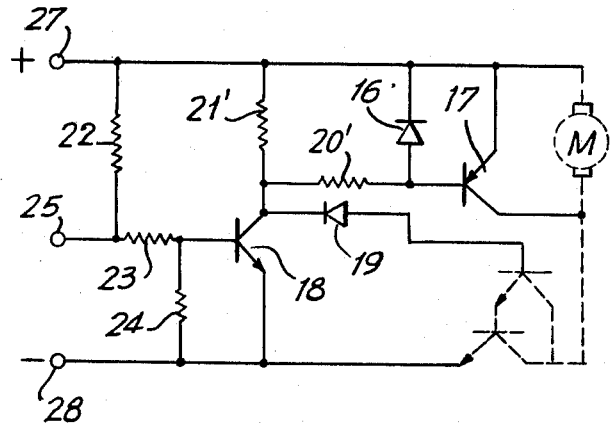
FIG. 2 is a circuit diagram of a DC motor control circuit constructed in accordance with an alternate embodiment of the instant invention.

Reference is now made to FIG. 2, wherein a DC motor control circuit constructed in accordance with an alternate embodiment of the instant invention is depicted, like reference numerals being utilized to denote like elements. For purposes of explanation, the speed-detecting circuit has been eliminated, thereby leaving only the START-STOP control circuit. The resistive control circuit formed by resistors 20' and 21' can be utilized instead of the divider circuit formed by resistors 20 and 21 illustrated in the preferred embodiment discussed above. Nevertheless, the operation of this circuit is the same in every other detail.

In accordance with the instant invention, the rotational speed of a DC motor can be controlled without regard to load changes, ambient temperature, and fluctuating DC supply voltages. Furthermore, DC motors can be driven at a predetermined rotational speed immediately after starting, and can be stopped within a short time. Also, the DC motor can be stopped and started in rapid repetition, because the number of rotations of the rotor after application of a stop signal is few. Thus, a DC motor utilizing a control circuit in accordance with the instant invention is particularly suitable for use in voice-actuated instruments, office equipment, automatic control instruments and the like, wherein a low voltage signal is utilized as a control signal. Moreover, a DC motor control circuit constructed in accordance with the instant invention provides for a simple, inexpensive circuit configuration wherein high stability and high reliability are achieved.

It is noted that the control circuit utilized for controlling rotational speed of the DC motor is actuated by controlling the voltage at the base electrode of the control transistor in response to a speed-detection signal taken off the DC motor. Nevertheless, other rotational speed-control circuits can be utilized with the START-STOP control circuit of the instant invention, and accordingly, the speed-detection circuit illustrated herein is only offered by way of example.

It will thus be seen that the objects set forth above, and those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A DC motor control circuit comprising a DC constant voltage source, control circuit means, a DC motor, a switching transistor means having a first switching control electrode, and two further electrodes defining a current path connected in parallel with said DC motor, said parallel connection being series connected to said DC voltage source and said control circuit means, and drive means coupled to said first switching control electrode, said drive means being adapted to produce a starting signal for opening said switching transistor means current path, and a stopping signal for closing said switching transistor means current path in response to the respective application of one of a START signal and STOP signal to said drive means, said drive means including a drive transistor having a first driving control electrode for receiving one of a START and STOP signal, and two further electrodes defining a current path, a first of said drive transistor current path electrodes being coupled to a reference potential, said other drive transistor current path electrode being coupled to said first switching control electrode to apply said starting signal and stopping signal thereto, and diode means coupled to said other drive transistor current path electrode and to said control circuit means for preventing said switching transistor means current path from closing when a START signal is applied to said first driving control electrode.

2. A DC motor control circuit as claimed in claim 1, wherein said START and STOP signals are respective low and high potential signals, and means are provided for applying said low START and high STOP potential signals to said first driving transistor control electrode to effect an opening and closing of said current path defined by said further drive transistor electrodes.

3. A DC motor control circuit comprising a DC constant voltage source, control circuit means, a DC motor, a switching transistor means having a first switching control electrode, and two further electrodes defining a current path connected in parallel with said DC motor, said parallel connection being series connected to said DC voltage source and said control circuit means, and drive means, said drive means including a first driving transistor having a first driving control electrode for receiving one of a START and STOP signal, and two further electrodes defining a current path, a first of said driving transistor current path electrodes being coupled to a reference potential, said other driving transistor current path electrode being coupled to said first switching control electrode for applying a starting signal thereto for opening said switching transistor means current path, and for further applying a stopping signal thereto for closing said switching transistor means current path in response to the respective application of one of said START signal and STOP signal to said first driving control electrode, and means for applying said START and STOP potential signals to said first driving transistor control electrode, said means for applying said START signal and STOP signal include first, second and third impedance elements, said first impedance element being coupled between said control electrode and said reference potential, and said second impedance element and third impedance element being connected in series between the drive transistor control electrode and said DC voltage source, the common connecting terminal of said second and third impedance elements defining a control input terminal whereat said START and STOP signals are applied.

4. A DC motor control circuit comprising a DC constant voltage source, control circuit means, a DC motor, a switching transistor means having a first switching control electrode, and two further electrodes defining a current path connected in parallel with said DC motor, said parallel connection being series connected to said DC voltage source and said control circuit means, and drive means coupled to said first switching control electrode, said drive means including a driving transistor having a first driving control electrode for receiving one of a START and STOP signal, and two further electrodes defining a current path, a first of said driving transistor current path electrodes being coupled to a reference potential, said other driving transistor current path electrode being coupled to said first switching control electrode to apply thereto a starting signal for opening said switching transistor means current path, and further apply thereto a stopping signal for closing said switching transistor means current path in response to the respective application of one of a START signal and STOP signal to said drive means, said control circuit means including a transistor means having current path electrodes in series with said DC motor, and a current path controlling electrode, a diode coupling said current path controlling electrode to said other driving transistor current path electrode, and an impedance element between the connection of said other drive transistor current path electrode, said switching transistor first switching control electrode, and said diode.

5. A DC motor control circuit as claimed in claim 4, including speed detecting means coupled to said motor for detecting the speed of rotation thereof and producing a signal proportional thereto and speed control current means coupled to said speed detecting means for receiving said speed proportional signal and coupled to said control circuit means for the control thereof to effect regulation of the speed of said motor.

6. A DC motor control circuit as claimed in claim 5, wherein said START and STOP signals are respective low and high potential signals, and means are provided for applying said low START and high STOP potential signals to said first driving transistor control electrode to effect an opening and closing of said current path defined by said other drive transistor electrodes.

7. A DC motor control circuit as claimed in claim 6, wherein said control circuit means includes a transistor means having current path electrodes in series with said DC motor, and a current path controlling electrode coupled to said speed control circuit means, a diode coupling said current path controlling electrode to said other driving transistor current path electrode, and an impedance element between the connection of said other drive transistor current path electrode, said switching transistor control electrode, and said diode.

8. A DC motor control circuit as claimed in claim 7, wherein each of said transistor means current path electrodes is a collector-emitter electrode path, and said other electrode is a base electrode.

9. A DC motor control circuit comprising a DC constant voltage source, control circuit means, a DC motor, a switching transistor means having a first switching control electrode, and two further electrodes defining a current path connected in parallel with said DC motor, said parallel connection being series connected to said DC voltage source and said control circuit means, and drive means coupled to said first switching control electrode, said drive means including a driving transistor having a first driving control electrode for receiving one of a START and STOP signal, and two further electrodes defining a current path, a first of said driving transistor current path electrodes being coupled to a reference potential, said other driving transistor current path electrode being coupled to said first switching control electrode to apply thereto a starting signal for opening said switching transistor means current path, and further apply thereto a stopping signal for closing said switching transistor means current path in response to the respective application of one of a START signal and STOp signal to said drive means, and including a first impedance element and a second impedance element wherein said other driving transistor current path electrode is connected through said first impedance element to said first switching control electrode, said connection of said first impedance element and first switching control electrode is coupled to said DC constant voltage source through said second impedance element.

10. A DC motor control circuit comprising a DC constant voltage source, control circuit means, a DC motor, a switching transistor means having a first switching control electrode, and two further electrodes defining a current path connected in parallel with said DC motor, said parallel connection being series connected to said DC voltage source and said control circuit means, and drive means coupled to said first switching control electrode, said drive means including a driving transistor having a first driving control electrode for receiving one of a START and STOP signal, and two further electrodes defining a current path, a first of said driving transistor current path electrodes being coupled to a reference potential, said other driving transistor current path electrode being coupled to said first switching control electrode to apply thereto a starting signal for opening said switching transistor means current path, and further apply thereto a stopping signal for closing said switching transistor means current path in response to the respective application of one of a START signal and STOP signal to said drive means, and including a first impedance element and a second impedance element, said other driving transistor current path electrode being coupled through said first impedance element to said first switching control electrode and said other driving transistor current path electrode also being coupled through said second impedance element to said DC voltage source.

* * * * *